US011224063B2

(12) United States Patent
Rietema et al.

(10) Patent No.: US 11,224,063 B2
(45) Date of Patent: Jan. 11, 2022

(54) SCHEDULED MEDIUM ACCESS FOR DIRECTIONAL MULTI-GIGABIT WIRELESS COMMUNICATIONS SYSTEMS

(71) Applicant: PERASO TECHNOLOGIES INC., Toronto (CA)

(72) Inventors: Albert Klaas Theodoor Rietema, Guelph (CA); Bradley Robert Lynch, Toronto (CA); Scott Kenneth Lindsay, Toronto (CA); Timor Israeli, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 60 days.

(21) Appl. No.: 16/705,958

(22) Filed: Dec. 6, 2019

(65) Prior Publication Data

US 2020/0187240 A1 Jun. 11, 2020

Related U.S. Application Data

(60) Provisional application No. 62/776,454, filed on Dec. 6, 2018.

(51) Int. Cl.
*H04W 72/12* (2009.01)
*H04W 88/08* (2009.01)
*H04W 72/04* (2009.01)
*H04W 8/00* (2009.01)

(52) U.S. Cl.
CPC ....... *H04W 72/1289* (2013.01); *H04W 8/005* (2013.01); *H04W 72/042* (2013.01); *H04W 72/0446* (2013.01); *H04W 72/1205* (2013.01); *H04W 72/1263* (2013.01); *H04W 88/08* (2013.01)

(58) Field of Classification Search
CPC .......... H04W 72/1289; H04W 72/042; H04W 72/0446; H04W 72/1205; H04W 72/1263; H04W 8/005; H04W 88/08
USPC ......................................................... 370/336
See application file for complete search history.

(56) References Cited

U.S. PATENT DOCUMENTS

| | | | | |
|---|---|---|---|---|
| 2018/0184451 | A1* | 6/2018 | Vannithamby | H04W 74/006 |
| 2019/0068255 | A1* | 2/2019 | Bolotin | H04W 52/0225 |
| 2019/0238303 | A1* | 8/2019 | Park | H04L 5/14 |
| 2020/0162135 | A1* | 5/2020 | Sun | H04B 17/318 |
| 2020/0204222 | A1* | 6/2020 | Lou | H04B 7/0417 |

* cited by examiner

*Primary Examiner* — Peter G Solinsky
(74) *Attorney, Agent, or Firm* — Perry + Currier

(57) ABSTRACT

A method in a wireless access point (AP) for controlling medium access includes: transmitting a beacon frame defining (i) a beacon header interval (BHI), and (ii) a data transmission interval (DTI) divided into a predetermined number of scheduled periods, each scheduled period containing a set of uplink allocation request sub-periods; sending, to a client device, an uplink allocation request assignment indicating an assigned uplink allocation request sub-period from the set, that corresponds to the client device; during a current one of the scheduled periods, receiving an uplink allocation request from the client device during the assigned uplink allocation request sub-period; determining an uplink allocation sub-period for the client device based on the uplink allocation request; and during a next one of the scheduled periods, sending an indication of the uplink allocation sub-period to the client device.

16 Claims, 7 Drawing Sheets

SCHEDULED MEDIUM ACCESS FOR DIRECTIONAL MULTI-GIGABIT WIRELESS COMMUNICATIONS SYSTEMS

CROSS-REFERENCE TO RELATED APPLICATION

This application claims priority from U.S. Provisional Patent Application No. 62/776,454, filed Dec. 6, 2018, the contents of which is incorporated herein by reference.

FIELD

The specification relates generally to wireless communications systems, and specifically to a method and system for implementing scheduled medium access in wireless communications systems.

BACKGROUND

Some wireless communications systems, such as those implemented according to members of the Institute of Electrical and Electronics Engineers (IEEE) 802.11 family of standards, employ contention-based medium access protocols. Contention-based medium access, however, can lead to inconsistent latency control within the network, which can degrade the performance of latency-sensitive applications such as voice over IP (VoIP), video streaming and the like. The above-mentioned performance impacts may also be more acute for greater numbers of client devices in a network.

SUMMARY

An aspect of the specification provides a method in a wireless access point (AP) for controlling medium access, the method comprising: transmitting a beacon frame defining (i) a beacon header interval (BHI), and (ii) a data transmission interval (DTI) divided into a predetermined number of scheduled periods, each scheduled period containing a set of uplink allocation request sub-periods; sending, to a client device, an uplink allocation request assignment indicating an assigned uplink allocation request sub-period from the set, that corresponds to the client device; during a current one of the scheduled periods, receiving an uplink allocation request from the client device during the assigned uplink allocation request sub-period; determining an uplink allocation sub-period for the client device based on the uplink allocation request; and during a next one of the scheduled periods, sending an indication of the uplink allocation sub-period to the client device.

Another aspect of the specification provides an access point (AP) comprising: an antenna array; and a controller configured to: transmit, via the antenna array, a beacon frame defining (i) a beacon header interval (BHI), and (ii) a data transmission interval (DTI) divided into a predetermined number of scheduled periods, each scheduled period containing a set of uplink allocation request sub-periods; send, to a client device, an uplink allocation request assignment indicating an assigned uplink allocation request sub-period from the set, that corresponds to the client device; during a current one of the scheduled periods, receive an uplink allocation request from the client device during the assigned uplink allocation request sub-period; determine an uplink allocation sub-period for the client device based on the uplink allocation request; and during a next one of the scheduled periods, send an indication of the uplink allocation sub-period to the client device.

BRIEF DESCRIPTIONS OF THE DRAWINGS

Embodiments are described with reference to the following figures, in which.

DETAILED DESCRIPTION

Figure 1:
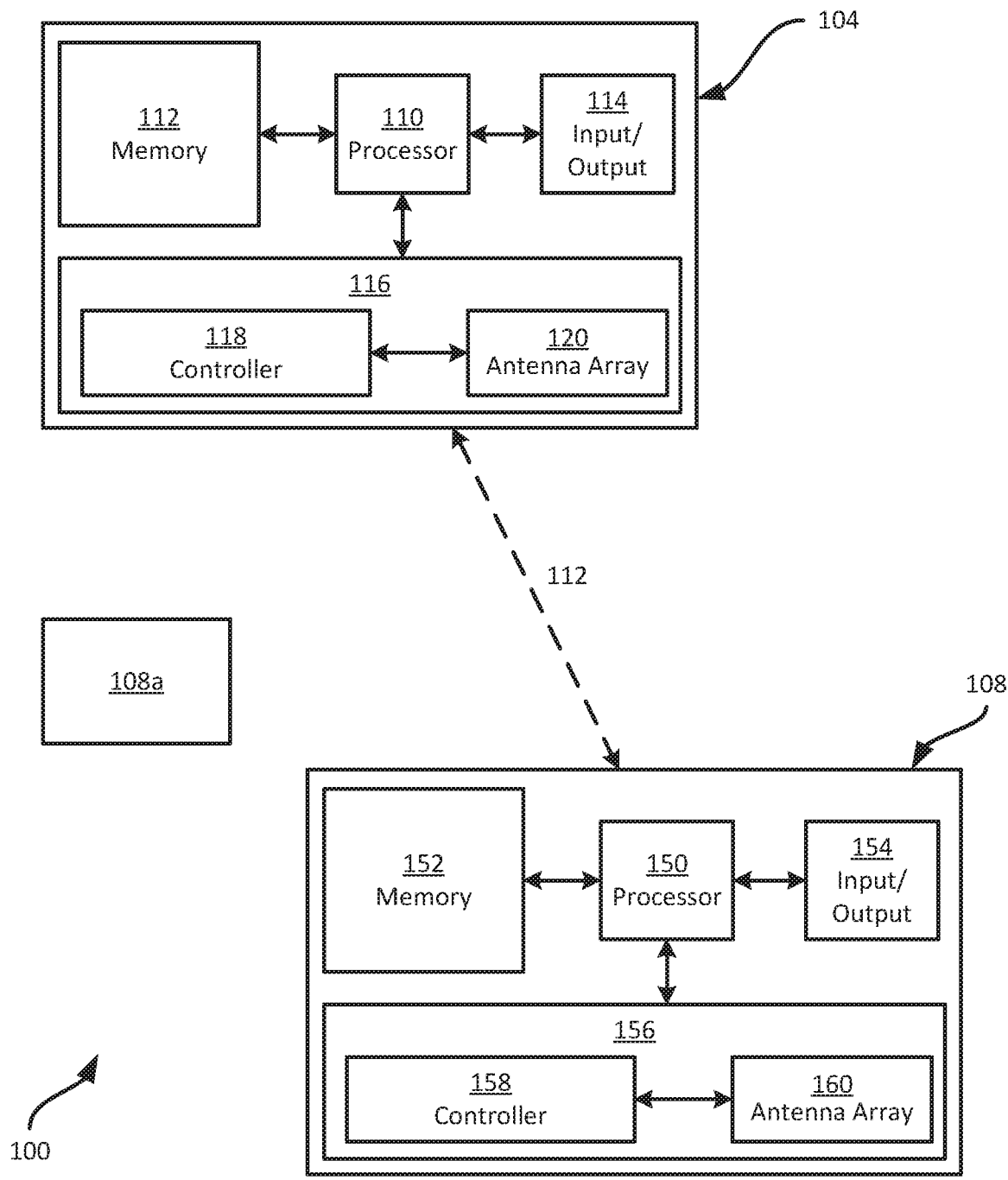
FIG. 1 is a diagram illustrating a wireless communication system.

FIG. 1 depicts a wireless communications system 100, including a plurality of wireless devices. In particular, FIG. 1 illustrates an access point (AP) 104 connected with a client device 108 (also simply referred to as the client 108) via a wireless link 112. An additional example client device 108*a* is also illustrated, which is not currently connected with the AP 104. The client device 108*a* includes components analogous to those of the client 108, discussed below. The client devices 108 and 108*a* may be referred to below collectively as the client devices 108.

The access point 104 can be, for example, a wireless router connecting the client devices 108 to a wide area network (not shown) such as the Internet. The access point 104 may also be, for example, a media server, a home computer, a mobile device, and the like. The client device 108, meanwhile, can be a mobile device such as a smartphone, a tablet computer and the like. The client device 108 may also be an access point itself, for example in implementations in which the devices 104 and 108 are components in a backhaul infrastructure. More generally, the access point 104 includes any computing device suitable to deploy a wireless local-area network (WLAN). The client device 108, meanwhile, includes any computing device suitable to join the above-mentioned WLAN.

The AP 104 and client 108 include respective central processing units (CPU) 110 and 150, also referred to as processors 110 and 150. The processors 110 and 150 are interconnected with respective non-transitory computer readable storage media, such as memories 112 and 152, having stored thereon various computer readable instructions for performing various actions. The memories 112 and 152 each include a suitable combination of volatile (e.g. Random Access Memory or RAM) and non-volatile memory (e.g. read only memory or ROM, Electrically Erasable Programmable Read Only Memory or EEPROM, flash memory). The processors 110 and 150 and the memories 112 and 152 each comprise one or more integrated circuits.

The AP 104 and client 108 also include respective input and output assemblies 114 and 154. The input and output assemblies 114 and 154 serve to receive commands from operators of the devices to control the operation thereof, and to present information, e.g. to the above-mentioned operators. The input and output assemblies 114 and 154 therefore include any suitable combination of keyboards or keypads, mice, displays, touchscreens, speakers, microphones, and the like. In other embodiments, the input and output assemblies 114 and 154 may be connected to the processors 110 and 150 via a network, or may simply be omitted. For example, the access point 104 may omit the input/output assembly 114.

The AP 104 and client 108 further include respective wireless communications assemblies 116 and 156 interconnected with the processors 110 and 150. The assemblies 116 and 156 enable the AP 104 and client 108, respectively, to communicate with other computing devices, including each other. In the present example, the assemblies 116 and 156 enable such communication according to wireless standards employing frequencies of around 60 GHz (also referred to as WiGig) and wide channel bandwidths (e.g. exceeding 1 GHz per channel). Examples of such standards are the IEEE 802.11ad standard, and enhancements thereto (e.g. 802.11ay). The assemblies 116 and 156 can also be configured to enable communications according to a variety of other standards, however, including other members of the 802.11 family of standards.

The communications assemblies 116 and 156 include respective controllers 118 and 158 in the form of one or more integrated circuits, configured to establish and maintain communications links with other devices (e.g., the link 112). The controllers 118 and 158 are configured to process outgoing data for transmission via respective antenna arrays 120 and 160 (e.g. each including a phased array of antenna elements) and to receive incoming transmissions from the arrays 120 and 160 and process the transmissions for communication to the processors 110 and 150. The controllers 118 and 158 can therefore each include a baseband processor and one or more transceivers (also referred to as radio processors), which may be implemented as distinct hardware elements or integrated on a single circuit.

As will be apparent to those skilled in the art, the antenna arrays 120 and 160 are directional arrays, controllable by the controllers 118 and 158 respectively to transmit or receive according to a variety of radiation patterns. The radiation patterns may also be referred to as sectors, and the controllers 118 and 158 can store sets of configuration parameters corresponding to each sector. A given sector can be activated, in other words, by applying the corresponding configuration parameters to the relevant antenna array.

The AP 104 and the client devices 108, as will be discussed below, are each configured to perform certain functions, once a connection such as the link 112 is established, to implement a scheduled access mechanism to the transmission medium rather than a contention-based access mechanism.

Figure 2:
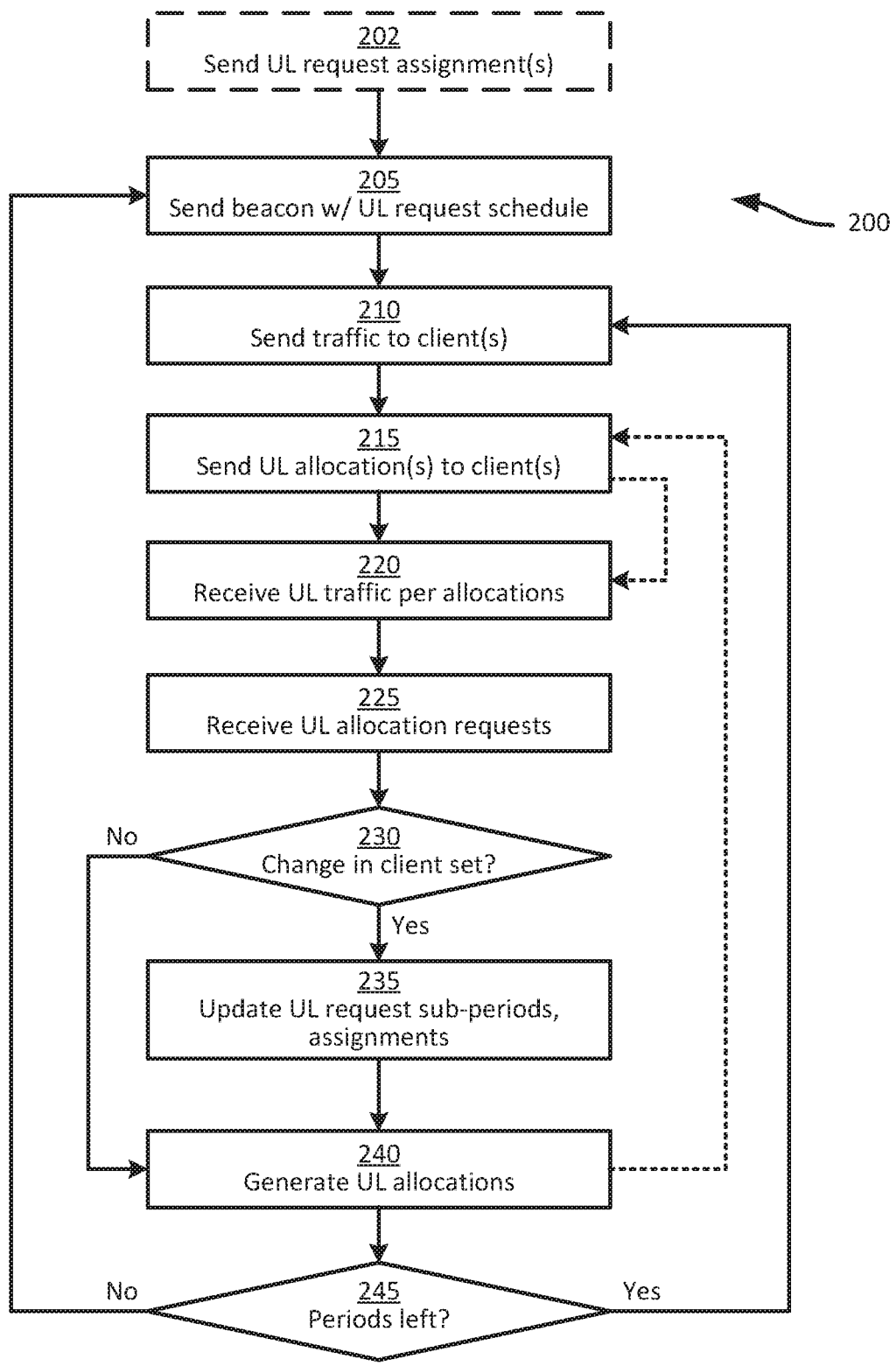
FIG. 2 is a flowchart of a method for controlling scheduled medium access at an access point.

Turning now to FIG. 2, a method 200 for controlling scheduled medium access is illustrated. The method 200 will be discussed in connection with its performance within the system 100, and in particular by the AP 104.

The example performance of the method 200 discussed below assumes that the client device 108 has previously established a connection with the AP 104, such as the link 112 shown in FIG. 1. The mechanism by which the client device 108 and the AP 104 establish the link 112 is not particularly limited. In some examples, the link 112 can be established according to the directional connection mechanism discussed in Applicant's application filed on the same day as the present application, entitled "Directional Scan And Connection Mechanisms In Wireless Communications Systems".

The discussion below also assumes that, because the client 108 has previously established the link 112 with the AP 104, the AP 104 has previously sent, to the client 108, an uplink allocation request assignment at block 202. The uplink allocation request assignment, as will be discussed in greater detail below, specifies a time when the client 108 is permitted to send a request to the AP 104 for a scheduled uplink allocation (i.e. time when the client 108 is granted access to the transmission medium to transmit data to the AP 104). The mechanisms by which an uplink allocation request assignment can be obtained and updated will also be discussed further below.

At block 205, the AP 104 sends a beacon for detection by the client 108 and any other client devices in the vicinity of the AP 104. More specifically, the AP 104 sends a plurality of beacon instances by controlling the antenna array 120 to transmit respective beacon frames using each sector 200. In other words, if the antenna array 120 has sixteen sectors, sixteen beacon frames are transmitted in succession, in sixteen different directions. Each beacon frame contains various information employed by client devices 108 to both establish connections with the AP 104 and determine how and when to exchange data with the AP 104 once connected. For example, the beacon frames each include a network address of the AP 104, an identifier of the WLAN implemented by the AP 104 (e.g. a service set identifier, SSID), and the like. Each beacon frame can also include a sector identifier, indicating which of the sectors of the antenna array 120 was activated to transmit that beacon frame.

Each beacon frame also includes scheduling data. The scheduling data defines at least a beacon header interval (BHI) and a data transmission interval (DTI), as will be apparent to those skilled in the art. In addition, and in contrast to previous wireless access control mechanisms, the beacon also defines a number of uplink allocation request sub-periods, which are to be assigned to specific client devices (though such assignment is not contained in the beacon itself).

Figure 3:
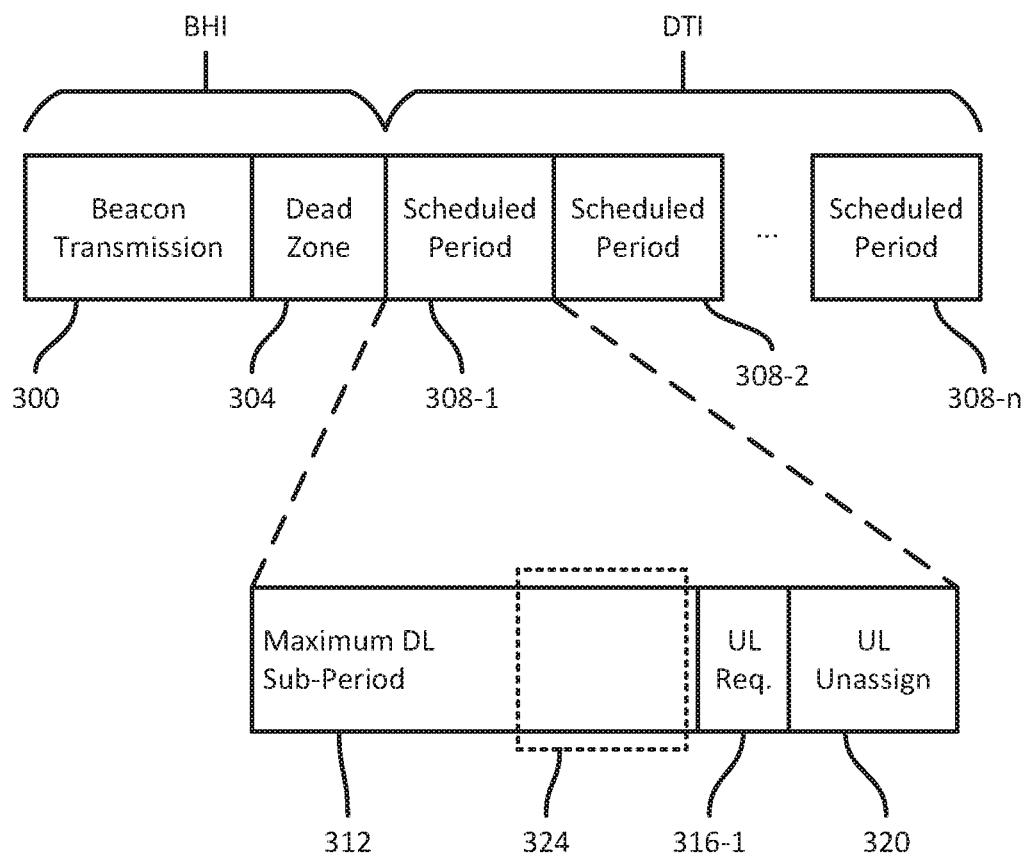
FIG. 3 is a diagram illustrating time periods defined by a beacon sent at block 205 of the method of FIG. 2.

Turning to FIG. 3, an illustration of the scheduling data defined in each beacon frame sent at block 205 is illustrated. It will be understood that the time periods illustrated in FIG. 3 are not shown to scale. Further, the beacon frame can define these time periods in a wide variety of ways (e.g. with slot index values, duration values, slot counts, and the like).

The beacon frame defines the above-mentioned BHI, which can be subdivided into a beacon transmission interval (BTI) 300 and a dead zone 304, which may be used by client devices 108 and/or the AP 104 for transmission-sensitive calibration routines or the like. In other examples, the dead zone 304 can be omitted. The beacon frame also defines the DTI mentioned above, which is subdivided into a predetermined number of scheduled periods 308-1, 308-2, . . . 308-n. That is, the beacon indicates the number of scheduled periods 308 and the duration of each scheduled period 308. In the present example, the scheduled periods 308 have a common duration. The number of scheduled periods 308 and the duration of the scheduled periods 308, employed by the AP 104 are configurable. Indeed, the length of the DTI itself is also configurable. For example, a DTI with a length of 100 time units (TU, 1024 microseconds) may be subdivided into twenty scheduled periods 308 each having a length of 5 TU. A wide variety of other lengths of DTI, and numbers of scheduled periods 308 may also be employed. The beacon can also, in some examples, indicate the total length of the DTI and the duration of a scheduled period, allowing client devices 108 to determine the number of scheduled periods locally and reducing the amount of data to be contained in the beacon.

The beacon further defines subdivisions of the scheduled periods 308 (with each scheduled period 308 being subdivided according to the same parameters). In particular, as also shown in FIG. 3, each scheduled period 308 includes a downlink sub-period 312, and a set of uplink allocation request sub-periods. In the present example, the set includes one uplink allocation request sub-period 316-1, because it is assumed that a single client (i.e. the client 108) is connected to the AP 104. The beacon also defines, in this case, a block of unassigned allocation request time 320 (also simply referred to as an unassigned block 320). The unassigned block 320 may be used by client devices that have not yet joined the network to initiate a connection with the AP 104. As will be seen below, when additional client devices are connected to the AP 104, additional uplink allocation request sub-periods are defined in subsequent beacons, and the unassigned block 320 may be shortened.

As will now be apparent to those skilled in the art, the downlink sub-period 312 is a period of time during which the AP 104 may transmit data (e.g. VoIP traffic or the like) to client devices. However, the beacon does not define any sub-periods during which the client devices can transmit data traffic to the AP 104. As will be discussed below, such uplink sub-periods are implemented in separate communications. The uplink sub-periods consume a variable portion of the downlink sub-period 312, e.g. as generally indicated by the portion 324 shown in dashed lines in FIG. 3. The downlink sub-period 312, as defined in the beacon, is therefore referred to as a maximum downlink sub-period, as the length of the sub-period 312 can be reduced in order to provide uplink sub-periods.

Returning to FIG. 2, at block 210 the AP 104 sends any data pending for delivery to the client devices during the downlink sub-period 312. For example, the AP 104 can subdivide the downlink sub-period into traffic portions corresponding to respective client device. Thus, in the present example, a single traffic portion may be used, as only the client 108 is currently connected with the AP 104. In the present example, the client 108 is permitted to transmit acknowledgement frames (ACKs) to the AP 104 during the downlink sub-period 312, rather than waiting until an uplink sub-period to transmit ACKs. The transmission of ACKs simultaneously with downlink transmission may reduce the load on transmission buffers at the AP 104, which may be required to store transmitted data until an ACK is received.

At block 215, the AP 104 sends an indication of an uplink allocation sub-period to the client 108. More generally, the AP 104 can send any number of uplink allocations between zero and the number of clients connected to the AP 104. Each uplink allocation sub-period is a period of time (subtracted from the maximum downlink sub-period 312) during which a specific client (e.g. the client 108) has exclusive access to the medium to transmit data to the AP 104. The data defining the uplink allocations is generated at the AP 104 according to any suitable scheduling algorithm. The specific method(s) for generating uplink allocations is outside the scope of the present disclosure. As will be seen below, the uplink allocations are generated based in part on uplink allocation requests received from the client devices in the preceding scheduled period 308. The indications of uplink allocation sub-periods are themselves transmitted during the downlink sub-period 312.

At block 220, the AP 104 receives uplink traffic from each connected client according to the uplink allocations transmitted at block 215. The dashed line from block 215 to block 220 indicates that the data sent at block 215 dictates the timing of the processes at block 220. That is, for each uplink allocation sub-period, the AP 104 is configured to control the antenna array 120 to receive data on a previously determined sector corresponding to one of the client devices, and to receive data from that client device. The same process is the repeated for any remaining uplink allocation sub-periods.

Figure 4:
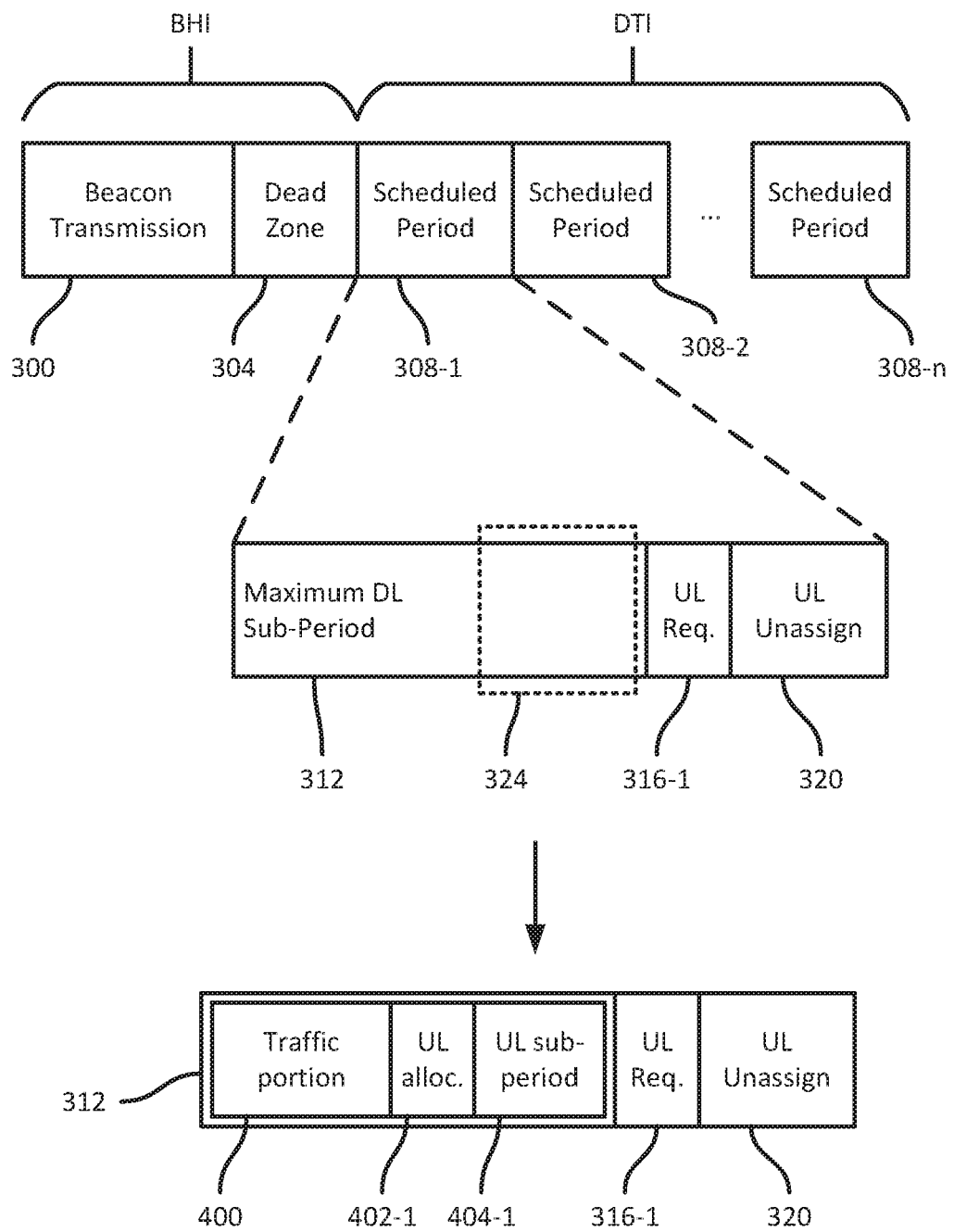
FIG. 4 is a diagram illustrating an example structure for uplink allocation periods.

Turning to FIG. 4, an example subdivision of the maximum downlink sub-period into a traffic portion 400, an uplink allocation portion 402-1 (during which the uplink allocation is sent at block 215), and an uplink allocation sub-period 404-1 is shown. The parameters defining the timing of the uplink allocation sub-period 404-1 are those sent at block 215 to the client 108, during the uplink allocation portion 402-1. Each uplink allocation definition is sent only to the corresponding client device. As will be apparent, when additional client devices are connected to the AP 104, additional uplink sub-periods 404 may be implemented by the AP 104. The traffic portion 400 may therefore be shortened, and/or the length of the uplink allocation sub-periods can be shortened. Each uplink allocation sub-period need not have the same length as the other uplink allocation sub-periods.

Returning to FIG. 2, at block 225, following the completion of all uplink allocation sub-periods, the AP 104 is configured to receive uplink allocation requests during the uplink allocation request sub-periods mentioned above. In particular, the AP 104 is configured to tune the antenna array 120 to a previously configured sector corresponding to each client device (e.g. defined during an earlier beamforming procedure with each client device) for each uplink allocation request sub-period, and listen for an uplink allocation request. Client devices may each send a single uplink allocation request during the specific uplink allocation request sub-period assigned to them. Thus, the client 108 may send no uplink allocation request, or may send one uplink allocation request during the sub-period assigned to the client 108 at block 202. As will be apparent, the assigned sub-period for the client 108 in this example is the sub-period 316-1 shown in FIGS. 3 and 4.

The uplink allocation requests can take a variety of forms. For example, each client device can be configured to transmit an uplink allocation request frame indicating a minimum amount of uplink time required by the client device to transmit data to the AP 104. In other examples, each client device can indicate, in the uplink allocation request, a requested amount of time for each of a plurality of traffic identifiers (TIDs), such as those defined in the 802.11 family of standards. In examples in which uplink allocation requests include requested time for distinct TIDs, the uplink allocations transmitted at a subsequent performance of block 215 can also include allocated time for each TID.

Following receipt of any uplink allocation requests, the AP 104 is configured to generate uplink allocations (i.e. data defining uplink allocation sub-periods 404) for transmission at a subsequent performance of block 215. The AP 104 can also, however, determine whether to adjust the uplink allocation request sub-periods 316 and the unassigned block 320. Specifically, at block 230 the AP 104 can determine whether a change in the set of connected client devices has occurred. Such a change can include the detection of a new client device, or the absence of a previously connected client device.

When the determination at block 230 is affirmative, the AP 104 proceeds to block 235. When a new client device is detected (e.g. via a request received during the unassigned block 320, as will be discussed below), the unassigned block 320 is contracted and another uplink allocation request sub-period is generated, for transmission in the next beacon. On the other hand, when a previously connected client device loses or otherwise terminates its connection, the AP 104 can expand the unassigned block 320 and reduce the number of uplink allocation request sub-periods by one. In other words, the total time occupied by the uplink allocation request sub-periods and the unassigned block 320 may remain constant.

Adjustments made at block 235 may lead to reassignment of a given client device to a different uplink allocation request sub-period. For example, to ensure that the unassigned block 320 remains a contiguous block of time, active client devices may be assigned different uplink allocation request sub-periods following disconnection of another client device. Such reassignments can be transmitted at block 215 with the next set of uplink allocation definitions, or as separate frames before block 215.

Following the performance of block 235, or following a negative determination at block 230, the AP 104 proceeds to block 240 and generates uplink allocation sub-period definitions for the next scheduled period 308 (as indicated by the dashed line from block 240 to block 215). As noted earlier, the specific mechanisms by which uplink allocations are generated are beyond the scope of the present disclosure.

Following generation of uplink allocations, the AP 104 determines whether additional scheduled periods 308 remain in the current DTI. When the determination at block 245 is affirmative, the AP 104 returns to block 210 to execute the next scheduled period. As will now be apparent, at the next performance of block 215, indications of the uplink allocations generated at block 240 will be transmitted. When the determination at block 245 is negative, the AP 104 instead returns to block 205 to send further beacon(s).

Figure 5:
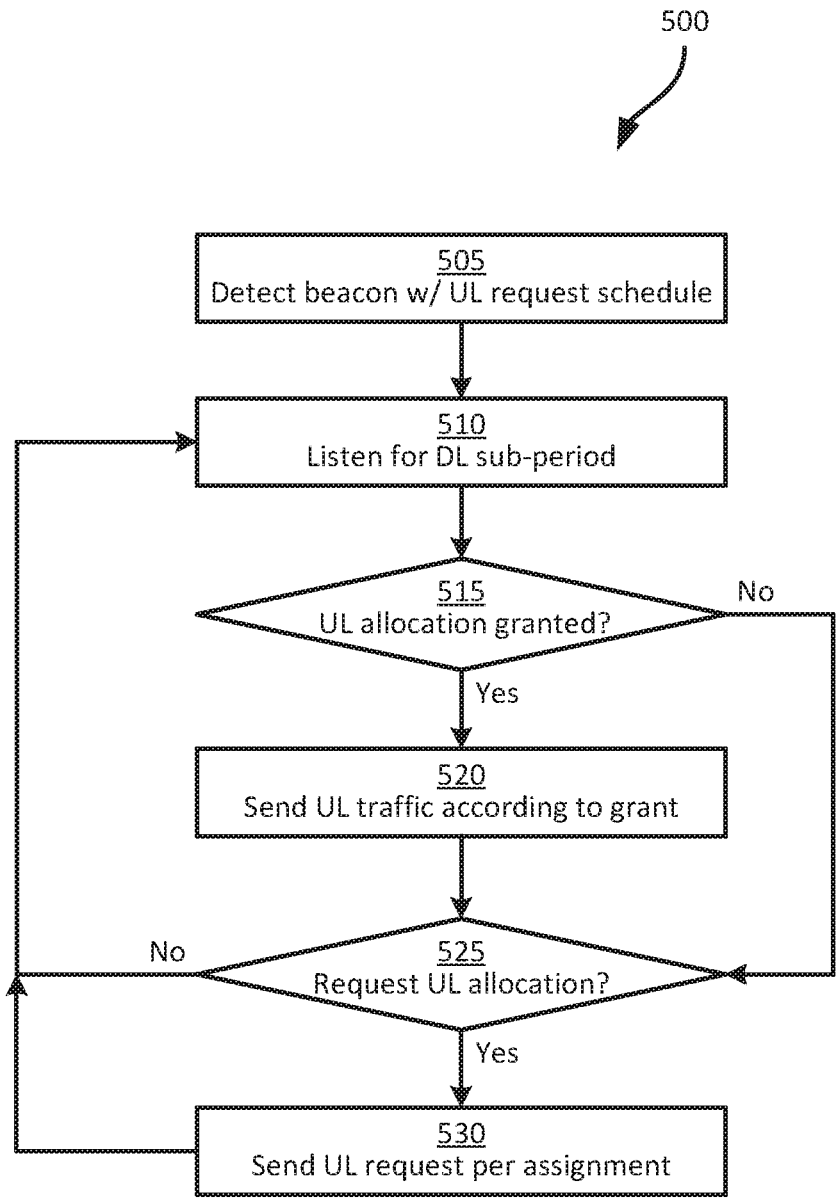
FIG. 5 is a flowchart of a method for scheduled medium access at a client device.

From the above discussion, it will be apparent that the client devices 108 perform functions that are complementary to those of the AP 104. In particular, FIG. 5 illustrates a method 500 of scheduled medium access at a client device 108, performed by a client device 108 that has already established a connection with the AP 104 (and has therefore already received an uplink allocation request sub-period assignment).

At block 505, the client 108 detects the above-mentioned beacon transmitted at block 205. At block 510, the client 108 listens for the downlink sub-period 312. As noted earlier, the beacon does not define uplink allocation sub-periods, and therefore the client 108 remains in a listening mode until either the downlink sub-period 312 ends or an uplink allocation (sent by the AP 104 at block 215) is received.

At block 515 the client 108 determines whether an uplink allocation definition 402 was received. When the determination at block 515 is affirmative, at block 520 the client 108 may transmit data to the AP 104 during the defined uplink allocation sub-period 404. When the determination at block 515 is negative, however the client 108 proceeds to block 525. The controller 158 of the client 108 can enter a low-power mode following a negative determination at block 515. As seen in FIG. 5, the client 108 also proceeds to block 525 after block 520 is complete.

At block 525, the client 108 determines whether to send an uplink allocation request at the assigned uplink allocation request sub-period. The determination at block 525 can be based on, for example, whether the client 108 has any traffic to send to the AP 104. When the determination at block 525 is negative, the client 108 returns to block 510, and may enter a low-power mode until the next downlink sub-period 312 begins. When the determination at block 525 is affirmative, the client 108 sends an uplink allocation request at block 530 and then returns to block 510. The uplink allocation request sent at block 530 is sent during the previously assigned uplink allocation request sub-period specific to the client 108.

Figure 6:
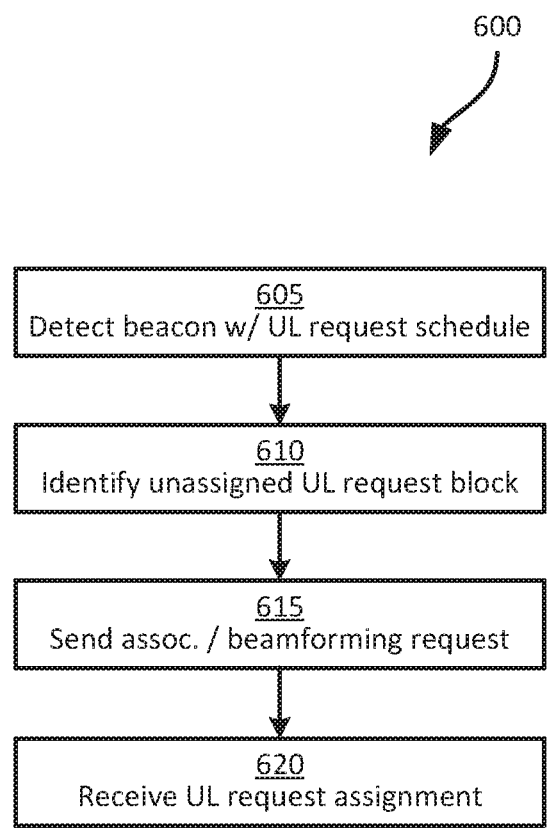
FIG. 6 is a flowchart of a method for initiating a connection at a client device.

FIG. 6 illustrates a method 600 of establishing a connection with the AP 104, by a client device 108 (e.g. the client 108a) that is not yet connected to the AP 104. At block 605, the client 108a can detect the above-mentioned beacon, which defines the unassigned block 320. At block 610 the client 108a identifies the unassigned block 320 (i.e. the timing of the unassigned block 320) based on the beacon. The client 108a may also select a portion of the unassigned block 320 (e.g. at random). At block 615, during the selected portion of the unassigned block 320, the client 108a transmits an association and/or beamforming request to the AP 104. The request sent at block 615 initiates a beamforming and connection process with the AP 104, following which the AP 104 sends an uplink allocation request sub-period assignment to the client 108a, which receives and stores the assignment at block 620. Following block 620, the client 108a can interact with the AP 104 as described above in connection with FIG. 5.

Figure 7:
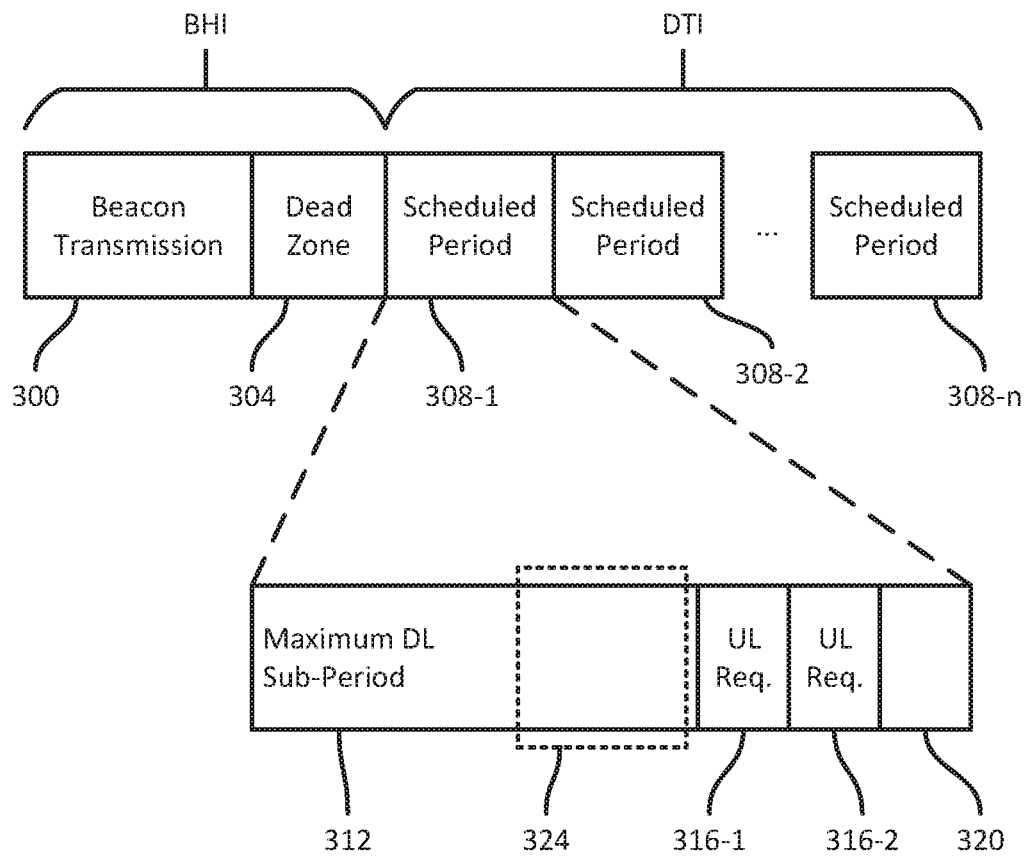
FIG. 7 is another diagram illustrating time periods defined by a beacon sent at block 205 of the method of FIG. 2.

As will now be apparent, the receipt of the request from block 615 at the AP 104 can lead to an affirmative determination at block 230. In response to the arrival of the second client 108a, for example, the AP 104 may create a second uplink allocation request sub-period 316-2, shown in FIG. 7. As also shown in FIG. 7, the AP 104 may reduce the length of the unassigned block 320 by an amount equal to the length of the sub-period 316-2.

Variations to the above systems and methods are contemplated. For example, in the above discussion it is assumed that a number of uplink allocation request sub-periods equal to the number of connected clients 108 is provided in each scheduled period 308. In other examples, however, each scheduled period can include a smaller number of uplink allocation request sub-periods than the number of connected clients 108. In such examples, each client 108 may be permitted to send an uplink allocation request only once every two scheduled periods 308 (or greater numbers of scheduled periods 308). The AP 104 may continue to grant uplink allocation sub-periods to each client 108 for each scheduled period 308, however.

The scope of the claims should not be limited by the embodiments set forth in the above examples, but should be given the broadest interpretation consistent with the description as a whole.

The invention claimed is:

1. A method in a wireless access point (AP) for controlling medium access, the method comprising:
    transmitting a beacon frame defining (i) a beacon header interval (BHI), and (ii) a data transmission interval (DTI) divided into a predetermined number of scheduled periods, each scheduled period containing a downlink sub-period, and a set of uplink allocation request sub-periods following the downlink sub-period;
    sending, to a client device during the downlink sub-period of a current one of the scheduled periods, an uplink allocation request assignment indicating an assignment of one of the uplink allocation request sub-periods from the set exclusively to the client device;
    receiving an uplink allocation request from the client device during the assigned uplink allocation request sub-period of the current scheduled period, the uplink allocation request defining a requested amount of uplink time;

determining an uplink allocation sub-period for the client device based on the uplink allocation request; and during the downlink sub-period of a next one of the scheduled periods, sending an indication of the determined uplink allocation sub-period to the client device.

2. The method of claim 1, wherein the beacon further defines, for each scheduled period within the DTI, a downlink sub-period.

3. The method of claim 2, wherein the downlink sub-period is defined as a maximum downlink sub-period.

4. The method of claim 2, wherein sending the indication of the uplink allocation sub-period follows a downlink traffic portion of the downlink sub-period of the next scheduled period; and wherein the uplink allocation sub-period follows the indication of the uplink allocation sub-period.

5. The method of claim 2, further comprising:

during the next scheduled period, receiving uplink data from the client device during the uplink allocation sub-period.

6. The method of claim 5, further comprising:

during the next scheduled period, receiving a further uplink allocation request from the client device during the assigned uplink allocation request sub-period.

7. The method of claim 1, wherein the beacon further defines, for each scheduled period, a block of unassigned allocation request time following the uplink allocation request sub-periods; and wherein the method further comprises:

receiving a connection request from a second client device during the unassigned allocation request time;

adjusting the set of uplink allocation request sub-periods and the block of unassigned allocation request time; and sending a second uplink allocation request assignment to the second client device.

8. The method of claim 7, wherein the adjusting includes expanding the set and contracting the block of unassigned allocation request time.

9. An access point (AP) comprising:

an antenna array; and a controller configured to:

transmit, via the antenna array, a beacon frame defining (i) a beacon header interval (BHI), and (ii) a data transmission interval (DTI) divided into a predetermined number of scheduled periods, each scheduled period containing a downlink sub-period, and a set of uplink allocation request sub-periods following the downlink sub-period;

send, to a client device during the downlink sub-period of a current one of the scheduled periods, an uplink allocation request assignment indicating an assignment of one of the uplink allocation request sub-periods from the se exclusively to the client device;

receive an uplink allocation request from the client device during the assigned uplink allocation request sub-period of the current scheduled period, the uplink allocation request defining a requested amount of uplink time;

determine an uplink allocation sub-period for the client device based on the uplink allocation request; and during the downlink sub-period of a next one of the scheduled periods, send an indication of the determined uplink allocation sub-period to the client device.

10. The access point of claim 9; wherein the beacon further defines, for each scheduled period within the DTI, a downlink sub-period.

11. The access point of claim 10, wherein the downlink sub-period is defined as a maximum downlink sub-period.

12. The access point of claim 10, wherein the controller is configured to:

send the indication of the uplink allocation sub-period following a downlink traffic portion the downlink sub-period of the next scheduled period; and wherein the uplink allocation sub-period follows the indication of the uplink allocation sub-period.

13. The access point of claim 10, wherein the controller is further configured to:

during the next scheduled period, receive uplink data from the client device during the uplink allocation sub-period.

14. The access point of claim 13, wherein the controller is further configured to:

during the next scheduled period, receive a further uplink allocation request from the client device during the assigned uplink allocation request sub-period.

15. The access point of claim 9, wherein the beacon further defines, for each scheduled period, a block of unassigned allocation request time following the uplink allocation request sub-periods; and wherein the controller is further configured to:

receive a beamforming request from a second client device during the unassigned allocation request time;

adjust the set of uplink allocation request sub-periods and the block of unassigned allocation request time; and send a second uplink allocation request assignment to the second client device.

16. The access point of claim 15, wherein the controller is further configured, in order to adjust the set of uplink allocation request sub-periods and the block of unassigned allocation request time, to expand the set and contract the block of unassigned allocation request time.

* * * * *